Feb. 17, 1925.   1,526,812
T. H. THOMAS
TRAIN CONTROL DEVICE
Filed March 13, 1924
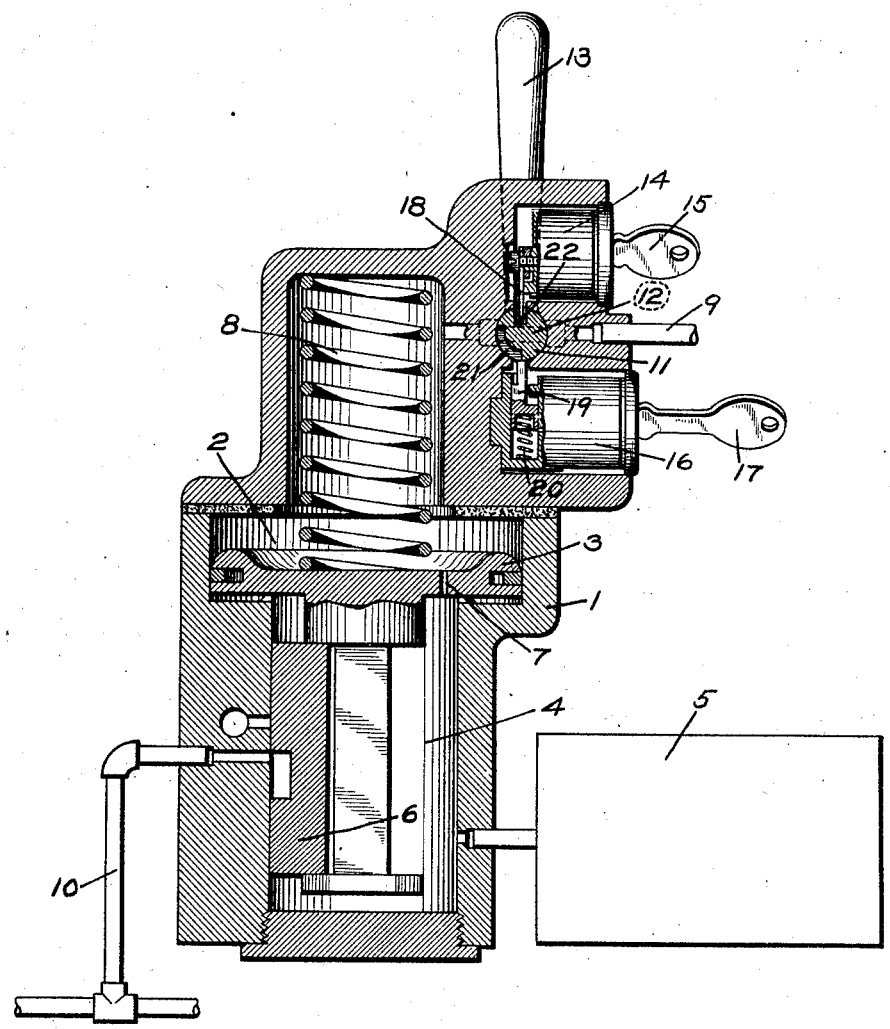
INVENTOR
THOMAS H. THOMAS
BY Wm. M. Cady
ATTORNEY Patented Feb. 17, 1925.

1,526,812

UNITED STATES PATENT OFFICE.

THOMAS H. THOMAS, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

TRAIN-CONTROL DEVICE.

Application filed March 13, 1924. Serial No. 698,874.

*To all whom it may concern:*

Be it known that I, THOMAS H. THOMAS, a citizen of the United States, residing at Edgewood, in the county of Allegheny and State of Pennsylvania, have invented new and useful Improvements in Train-Control Devices, of which the following is a specification.

This invention relates to automatic train control equipments and the principal object of the invention is to provide improved means for cutting the train control apparatus out of action.

In the accompanying drawing, the single figure is a sectional view of the brake application portion of an automatic train control apparatus, showing my improved cut-out mechanism applied thereto.

The brake application portion may comprise a casing 1 having a piston chamber 2, containing a piston 3, and a valve chamber 4, connected to a source of fluid under pressure, such as reservoir 5, and containing a slide valve 6 adapted to be operated by piston 3.

Fluid under pressure equalizes from valve chamber 4 through a restricted port 7 in piston 3 into piston chamber 2 and normally, the fluid pressures being equalized on opposite sides of the piston, the spring 8 maintains the piston 3 and slide valve 6 in release position, as shown in the drawing.

A pipe 9 communicates with piston chamber 2 and is connected to the automatic train control apparatus (not shown), so that when the train control apparatus acts, fluid under pressure will be vented from pipe 9 and piston chamber 2, causing the piston 3 to shift the slide valve 6 to application position, in which fluid is vented from the brake pipe 10 to effect an application of the brakes.

According to my invention, a cut-out cock 11 is interposed in the passage connecting pipe 9 with the piston chamber 2 and normally a passage 12 through said cock establishes communication from pipe 9 to piston chamber 2. A handle 13 is secured to the cock 11, so that the cock may be turned to cut off communication through pipe 9 and thus cut out the operation of the train control apparatus.

Two locks are provided, a lock 14 having a key 15 in the possession of the engineer and a master lock 16 having a key 17 which is held by a person authorized to check the engineer. The lock 14 controls the operation of a latch 18 which is adapted in the cut-in position of the cock 11 to engage in a slot 22 in the cock. The lock 16 is adapted to operate a latch 19 which is acted upon by a spring 20, so that when the cock 11 is rotated, the latch 19 will automatically engage in an elongated slot 21 in the cock 11.

If the engineer desires to cut the train control apparatus out of action, he inserts the key 15 in the lock 14 and turns the key so as to withdraw the latch 18 from engagement with the slot 22 in the cock 11. He then turns the handle 13 toward the left. The slot 21 is so extended that upon a slight movement of the cock 11, the latch 19 will be moved from spring 20 to engage in the slot 21. The continual movement of the handle 13 toward the left operates the cock 11 so as to cut off communication from pipe 9 to piston chamber 2.

The train control apparatus is thus prevented from functioning and if he desires the engineer may turn the handle toward the right from the cut-out position, sufficiently to cause the passage 12 to again establish communication from control pipe 9 to piston chamber 2, but he cannot turn the cock sufficiently so as to permit the latch 18 to again engage in the slot 22, since the engagement of the latch 19 in slot 21 will prevent such movement. As a consequence, the engineer's key 15 cannot be removed after having been inserted in the lock 14 and after the handle 13 has been turned, until an authorized person possessing the key 17 inserts said key in the lock 16 and thereby operates the lock 16 so as to withdraw the latch 19 from engagement in the slot 21.

It will thus be seen that the engineer cannot cut out the train control apparatus without some authorized person being advised through the fact that the key 15 remains in the lock 14.

It is desirable that the engineer have the power to cut the train control apparatus in or out of action in such cases as where a train is entering or leaving an automatic train control section or where in double heading service, it is desired to cut out the operation of the train control apparatus on the second locomotive.

Having now described my invention, what I claim as new and desire to secure by Letters Patent, is:—

1. In a train control apparatus, the combination with a control pipe and a cock for controlling communication through said pipe, of a handle for operating said cock, a latch for engaging said cock to prevent operation of the cock, a lock for operating said latch, a key in possession of the engineer for operating said lock, a second latch for engaging said cock to prevent rotation thereof, a master lock for operating said second latch, and a key in the possession of an authorized person for operating said master lock.

2. In a train control apparatus, the combination with a control pipe and a cock for controlling communication through said pipe, of a handle for operating said cock, a latch for engaging said cock to prevent operation of the cock, a lock for operating said latch, a key in possession of the engineer for operating said lock, a second latch for engaging said cock upon movement of the cock after the first latch is disengaged from the cock and adapted to permit movement of the cock to cut off or establish communication through said control pipe but to prevent movement to the position in which the first latch lockingly engages the cock, a second lock for operating the second latch, and a key in possession of an authorized person for operating said second lock.

3. In a train control apparatus, the combination with a control pipe, a cock for controlling communication through said pipe, and a handle for operating said cock, of a latch engaging a slot in the cock in the locking position of the cock, a lock for operating said latch, a key in possession of the engineer for operating said lock, a spring pressed latch for engaging an elongated slot in the cock upon movement of said cock from said locking position, a second lock for operating said spring pressed latch, and a key in the possession of an authorized person for operating said second lock.

In testimony whereof I have hereunto set my hand.

THOMAS H. THOMAS.